P. A. ZIMMERMAN.
LATHE DOG.
APPLICATION FILED NOV. 20, 1915.
1,180,362.
Patented Apr. 25, 1916.
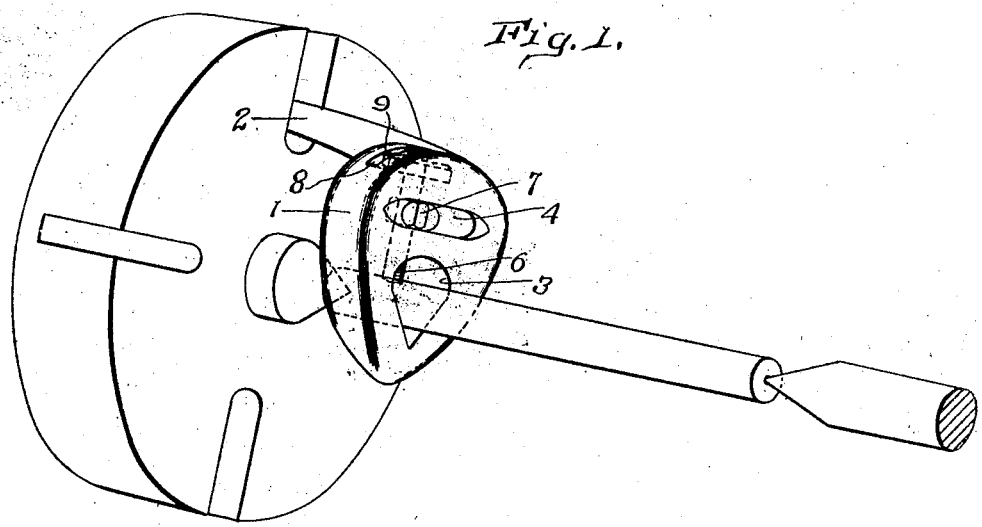
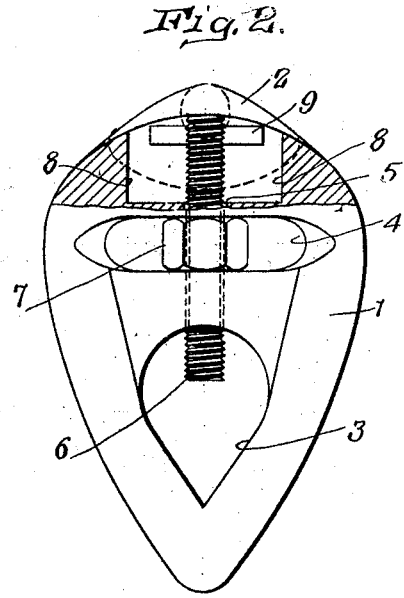
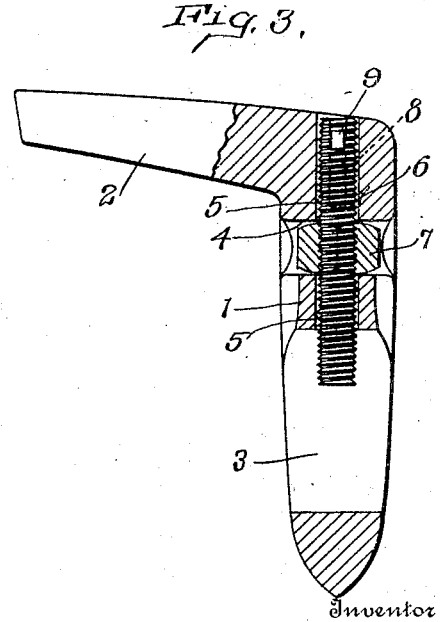
Inventor
Perry A. Zimmerman
By Edward Reed
Attorney

UNITED STATES PATENT OFFICE.

PERRY A. ZIMMERMAN, OF SPRINGFIELD, OHIO, ASSIGNOR TO THE WESTERN TOOL AND MANUFACTURING COMPANY, OF SPRINGFIELD, OHIO, A CORPORATION OF OHIO.

LATHE-DOG.

1,180,362.   Specification of Letters Patent.   Patented Apr. 25, 1916

Application filed November 20, 1915. Serial No. 62,448.

*To all whom it may concern:*

Be it known that I, PERRY A. ZIMMERMAN, a citizen of the United States, residing at Springfield, in the county of Clark and State of Ohio, have invented certain new and useful Improvements in Lathe-Dogs, of which the following is a specification, reference being had therein to the accompanying drawing.

This invention relates to lathe dogs.

Lathe dogs as commonly constructed comprise a work engaging screw, the head of which projects beyond the edge of the dog and is liable to, and frequently does, come in contact with the person or clothing of the operator and cause injury thereto. Further the work engaging screw is threaded directly into the body of the dog, and when, as frequently happens, the threads are stripped from the dog it is necessary either to ream out the opening and retap it and then use a larger screw, or, where this cannot be done, to discard the dog as a whole.

The object of the present invention is, first, to provide a safety dog, that is, one having no projecting parts which are liable to engage the person or clothing of the operator; and to this end it is a further object of the invention to so construct and arrange the work engaging device that both the device itself and its operating member will lie within the body of the dog.

It is also an object of the invention to mount the work engaging device in the dog without the use of screw threaded openings in the dog, thus enabling the work engaging device and its operating member to be renewed, thereby lengthening the life of the dog.

It is also an object of the invention to provide a dog of this character which can be manufactured at a low cost.

In the accompanying drawings, Figure 1 is a perspective view of a portion of a lathe showing the dog mounted thereon. Fig. 2 is a front elevation of the dog partly broken away and Fig. 3 is a longitudinal sectional view taken through the guide opening for the work engaging device.

In the device shown in the accompanying drawings, I have utilized a dog the main features of construction of which are well known. This dog comprises a body portion 1, which is preferably tapered toward one end and has projecting from one surface thereof, usually at the wider end thereof, a finger or bar 2, by means of which the dog may be connected with a rotatable supporting device, such as the face plate of a lathe. The dog is provided near the tapered end thereof, with an opening 3 to receive the work, which is usually elongated in form and is supported at its ends by the lathe centers, the dog serving to rotate the same against a cutting tool or other implement. In the ordinary construction of the dog, a work engaging screw is threaded into the body of the dog, at that end thereof adjacent the finger 2, and projects into the work receiving opening 3 to engage the work and clamp the dog firmly thereto. The head of this screw, however, projects beyond the edge of the dog with the objectionable results above mentioned. It has been proposed to overcome this difficulty in various ways, as by recessing the end of the dog to receive the head of the screw, and, also, by placing a guard about the head of the screw. Both methods are objectionable.

In carrying out my invention, I mount the work holding device and its actuating member within the body of the dog so that there are no parts that project in an objectionable manner. To this end, I have provided in the body of the dog a second opening 4, which is here shown in the form of an elongated slot extending transversely of the body portion of the dog, and arranged between the work receiving opening 3 and the supporting finger 2. The body of the dog has formed therein, and extending longitudinally thereof, a guideway 5, which intersects the second opening, or slot, 4 and has slidably mounted therein a work engaging device 6 which is preferably in the form of a rod having that portion thereof which extends through the second opening, 4, screw threaded. In the present device the rod is screw threaded throughout its length, but this is not necessary to the carrying out of the invention. Mounted upon the screw threaded portion of the work engaging device, and arranged within the slot 4 so as to be held against axial movement, is an actuating member 7, which in the present instance comprises an ordinary nut. The slot 4 is of such a size and shape as to permit the nut, or actuating member, to be engaged by a wrench, or other implement suitable for operating the same. The work engaging device, or rod, 6 is free to move longitudinally in its guideway but is held against rotary movement. Consequently, the rotation of the actuating member, or nut, will impart longitudinal movement to the work engaging device to move it into and out of clamping engagement with the work which is in the opening 3. The work engaging device may be held against rotary movement in any suitable manner, but in the construction here shown I have recessed the body of the dog on opposite sides of the guideway 5, at that end thereof adjacent the finger 2, as shown at 8, and have mounted in the adjacent end of the rod 6 a pin 9, the ends of which project beyond the sides of the rod into the recesses in the body of the dog, thus holding the rod firmly against rotation, but permitting the same to have a free longitudinal movement.

The operation of the device will be readily understood from the foregoing description, and it will be apparent that I have provided a dog, the work engaging device of which does not project beyond the edge of the dog in an objectionable manner at any point, and which can be actuated by a wrench, or other implement, in much the usual manner. Further, it will be apparent that the dog has all the strength and rigidity of the ordinary dog, and that it can be built at substantially the same cost as the ordinary dog, if not at a lower cost. Any additional work which might be required in connection with the new features of the dog is offset by the saving due to its being unnecessary to screw thread the guideway, as is customary in the ordinary dog. Further, it will be apparent that the work engaging device is supported in the dog by the nut, or actuating member, and if the threads are stripped from either the nut or the work engaging device, or either of these devices is injured in any manner, it is only necessary to remove and replace the injured member, or members, thus avoiding the necessity of discarding the dog as a whole and greatly lengthening the life of the dog.

While I have shown and described one embodiment of my invention, I wish it to be understood that I do not desire to be limited to the exact details of construction shown and described, as various modifications within the scope of the appended claims will occur to a person skilled in the art.

Having now fully described my invention what I claim as new, and desire to secure by Letters Patent is:—

1. A lathe dog or the like comprising a body portion having a work receiving opening and also having a second opening, a work engaging device extending through said second opening, mounted in said body portion on both sides of said second opening and having one end extending into said work receiving opening, and a part mounted on said work engaging device within said second opening to cause longitudinal movement to be imparted thereto.

2. A lathe dog or the like, comprising a body portion having a work-receiving opening and also having a second opening, a work-engaging device extending through said second opening, slidably mounted in said body portion on both sides of said opening and having one end extending into said work-receiving opening, and a part mounted on said work-engaging device within said second opening to cause longitudinal movement to be imparted thereto.

3. A lathe dog or the like comprising a body portion having a work receiving opening and a second opening, and also having a guideway formed therein, intersecting said second opening and leading into said work receiving opening, a work engaging device mounted in said guideway and having a screw threaded portion extending through said second opening, and a nut mounted on said screw threaded portion of said work engaging device in said second opening and held against axial movement, whereby the rotation of said nut will impart longitudinal movement to said work engaging device.

4. In a lathe dog or the like, a body portion having a work receiving opening and a guideway leading from one edge of said body portion to said opening, said body portion also having a second opening intersecting said guideway, a non-rotatable work engaging device slidably mounted in said guideway and having a screw-threaded portion extending into said second opening, and a nut mounted on said screw-threaded portion of said work engaging device in said second opening and held against axial movement.

5. A lathe dog or the like comprising a body portion having a work receiving opening and a second opening, a screw threaded work engaging device extending through said second opening into said work receiving opening and mounted for longitudinal movement in said body portion but held against rotary movement therein, and a nut mounted on said work engaging device within said second opening and held against axial movement.

6. A lathe dog or the like comprising a body portion having a work receiving opening and having a slot extending transversely thereof adjacent to said work receiving opening, a guideway extending lengthwise of said dog and intersecting said slot, a work engaging rod slidably mounted in said guideway, having one end adapted to enter said work receiving opening and having that portion thereof which extends through said slot screw threaded, means to hold said rod against rotary movement, and a nut mounted on the screw threaded portion of said rod within said slot and held against axial movement.

7. A lathe dog or the like comprising a body portion having a work receiving opening and a second opening, and also having a guideway intersecting said second opening and leading into said work receiving opening, a screw threaded work engaging device slidably mounted in said guideway, a nut mounted on said screw threaded device within said opening and held against axial movement, and a pin carried by said work engaging device and projecting beyond the sides thereof, said body portion of said dog being recessed on the opposite sides of said guideway to receive the projecting portions of said pin.

In testimony whereof, I affix my signature hereto.

PERRY A. ZIMMERMAN.